United States Patent [19]

Clewett

[11] 4,241,823
[45] Dec. 30, 1980

[54] CHAIN DRAG KIT FOR CONVEYOR

[75] Inventor: Merle E. Clewett, Clinton, Ill.

[73] Assignee: Union Iron Works, Inc., Warrensburg, Ill.

[21] Appl. No.: 71,678

[22] Filed: Aug. 31, 1979

[51] Int. Cl.$^3$ ............................................. B65G 19/28
[52] U.S. Cl. ................................... 198/727; 198/729; 198/735
[58] Field of Search ............. 198/727, 729, 734, 735, 198/728, 749, 716

[56] References Cited

U.S. PATENT DOCUMENTS

| | | | |
|---|---|---|---|
| 1,747,471 | 2/1930 | Eckardt et al. | 198/729 |
| 3,061,073 | 10/1962 | Wickam | 198/735 X |

FOREIGN PATENT DOCUMENTS 697993 10/1940 Fed. Rep. of Germany ........... 198/735

Primary Examiner—Bruce H. Stoner, Jr.
Assistant Examiner—Douglas D. Watts
Attorney, Agent, or Firm—Leydig, Voit, Osann, Mayer & Holt

[57] ABSTRACT

A chain drag conveyor kit for converting a screw conveyor, of the type having a main trough with a semi-circular bottom and substantially flat cover, to a chain drag conveyor. The kit includes a pair of sprocket boxes dimensioned for assembly on the respective ends of the main trough and having mutually aligned sprockets therein including a drive sprocket. An endless drag chain is trained about the sprockets. The drag chain has conveyor flights secured at spaced intervals, the flights each having a semi-circular edge conforming to the bottom of the main trough and having a straight edge. A relatively shallow auxiliary trough of rectangularly U-shaped cross section is nested into the main trough, the auxiliary trough forming a return guide surface for the straight edges of the flights on the upper run of chain. A series of clamps along the edges of the cover hold the assembly together. In the preferred embodiment the auxiliary trough is formed of short sections arranged end-to-end with upper and lower members at the end of a section defining a socket for the adjacent section, the upper member being centered in a position registered with clearance spaces in the successive flights to insure that the flights have smooth uninterrupted guidance from one section of the auxiliary trough to the next.

1 Claim, 7 Drawing Figures

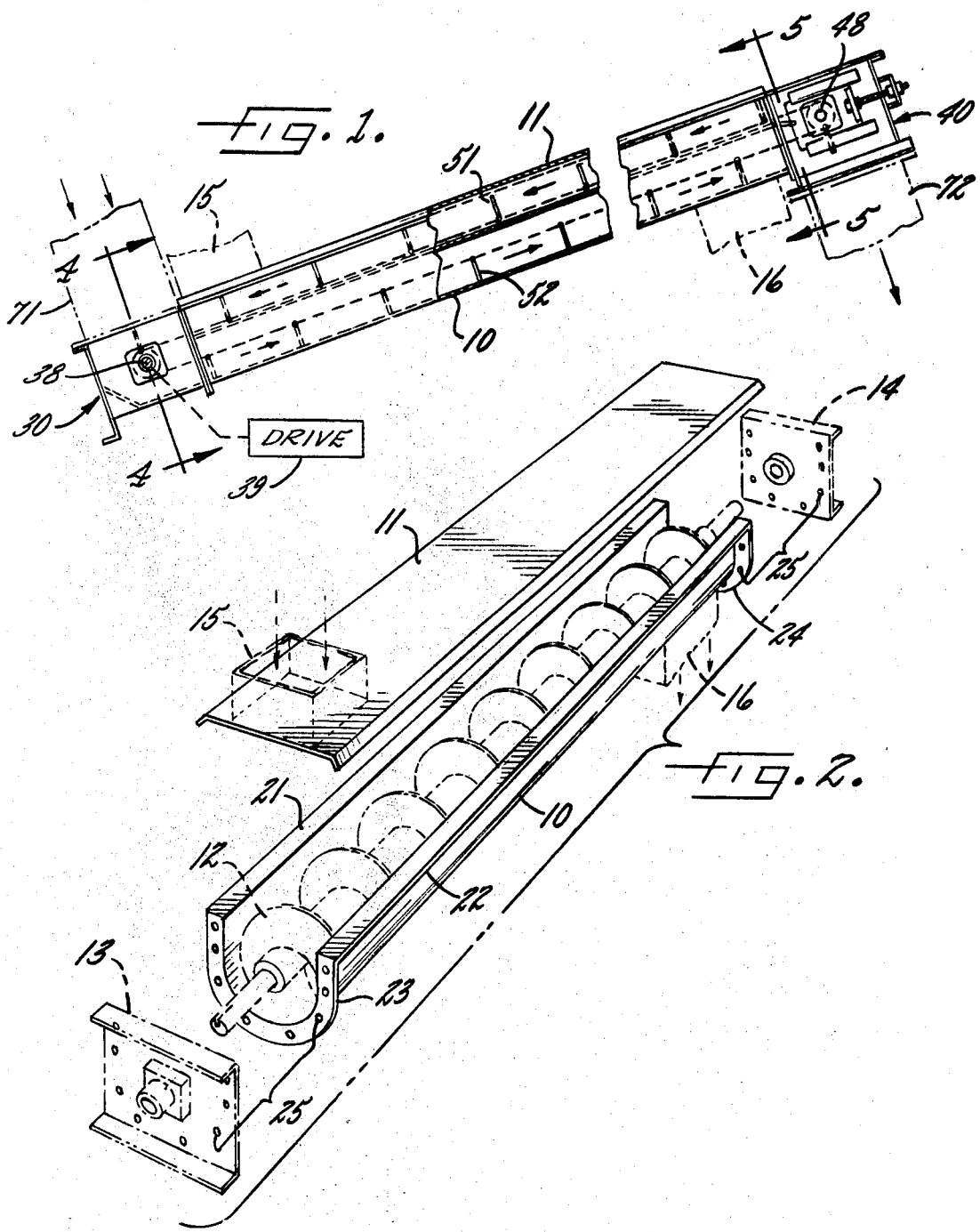

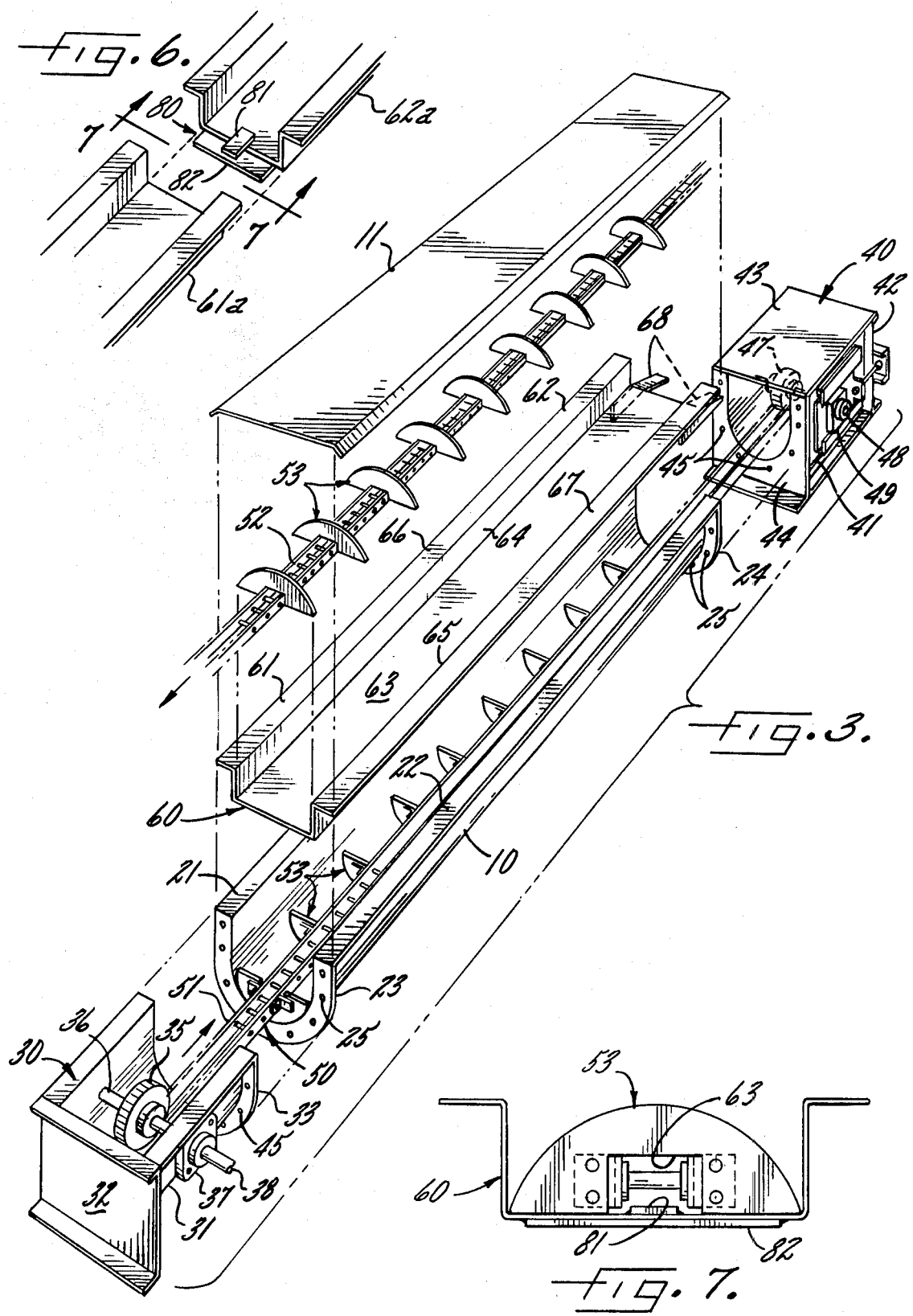

4,241,823

CHAIN DRAG KIT FOR CONVEYOR

Powered conveyors for bulk materials as, for example, grain, have generally been of two types, screw conveyors and chain drag conveyors. Examples of chain drag conveyors include Eckhart et al. U.S. Pat. No. 1,747,471, Bakker U.S. Pat. No. 3,774,751 and Owens et al. U.S. Pat. No. 1,752,612. Chain drag conveyors have a number of inherent advantages over screw conveyors including improved delivery capacity, more positive transport of bulk materials, capability of operation at a steeper angle of lift, energy efficiency and capability of handling materials such as grain without injury and without affecting quality.

As the benefits of chain drag, including the energy-saving possibilities of this type of conveyor have become more fully recognized, a replacement market has developed. However, many owners of screw type conveyors, particularly where still in good condition, have been reluctant to scrap their conveyors and to substitute new units of the chain drag type.

It is, accordingly, an object of the present invention to provide a kit for easy and economical conversion of a screw type conveyor to a chain drag conveyor.

It is, more specifically, an object of the invention to provide a conversion kit which makes continued use of the most costly elements of the screw conveyor, primarily the main trough and the mounting therefor, as well as the cover, and which requires only the addition of sprocket boxes, drag chain, conveyor flights and an auxiliary trough for guiding and supporting the flights in their return movement.

It is another object to provide a conversion kit for converting a screw type conveyor into a chain drag conveyor over a wide range of size including the largest commercial units in which the kit itself is highly economical costing only a fraction of the cost of a complete chain drag conveyor and in which the conversion may be made quickly, easily and surely by untrained shop personnel employing only the simplest of mechanical tools.

It is yet another object of the present invention to provide a conversion kit which may be employed regardless of the length of the conveyor and in which the auxiliary trough, which supports the flights and return run of chain, is provided in relatively short manageable sections which are fitted together. It is therefore a related object to provide a conversion kit capable of accommodating even the longest of bulk conveyors but in which the kit itself occupies a compact package enabling easy handling and low shipping expense.

It is an object of the invention in one of its aspects to provide a kit which includes a plurality of auxiliary trough sections fitted end to end to any desired length and in which a perfect fit is achieved without requiring any special knowledge or skill on the part of the installer, thereby insuring that the flights have smooth uninterrupted guidance from one section of the trough to the next over the entire length of the conveyor.

Other objects and advantages of the invention will become apparent upon reading the attached detailed description and upon reference to the drawings in which:

FIG. 1 is a side elevation, in partial section, of a chain drag conveyor constructed using a kit in accordance with the present invention.

FIG. 2 is an exploded view of a screw type conveyor with the retained elements indicated by the full lines and with the discarded elements being indicated by the dot-dash lines.

FIG. 3 is an exploded view showing the parts of the kit and the manner in which such kit is installed.

FIG. 6 shows the nature of the interfitted joints between adjacent sections of the auxiliary trough.

FIG. 7 is a fragmentary sectional view looking along line 7—7 in FIG. 6 showing the condition of register between the upper socket member and the flight clearance space.

Figures 4, 5:
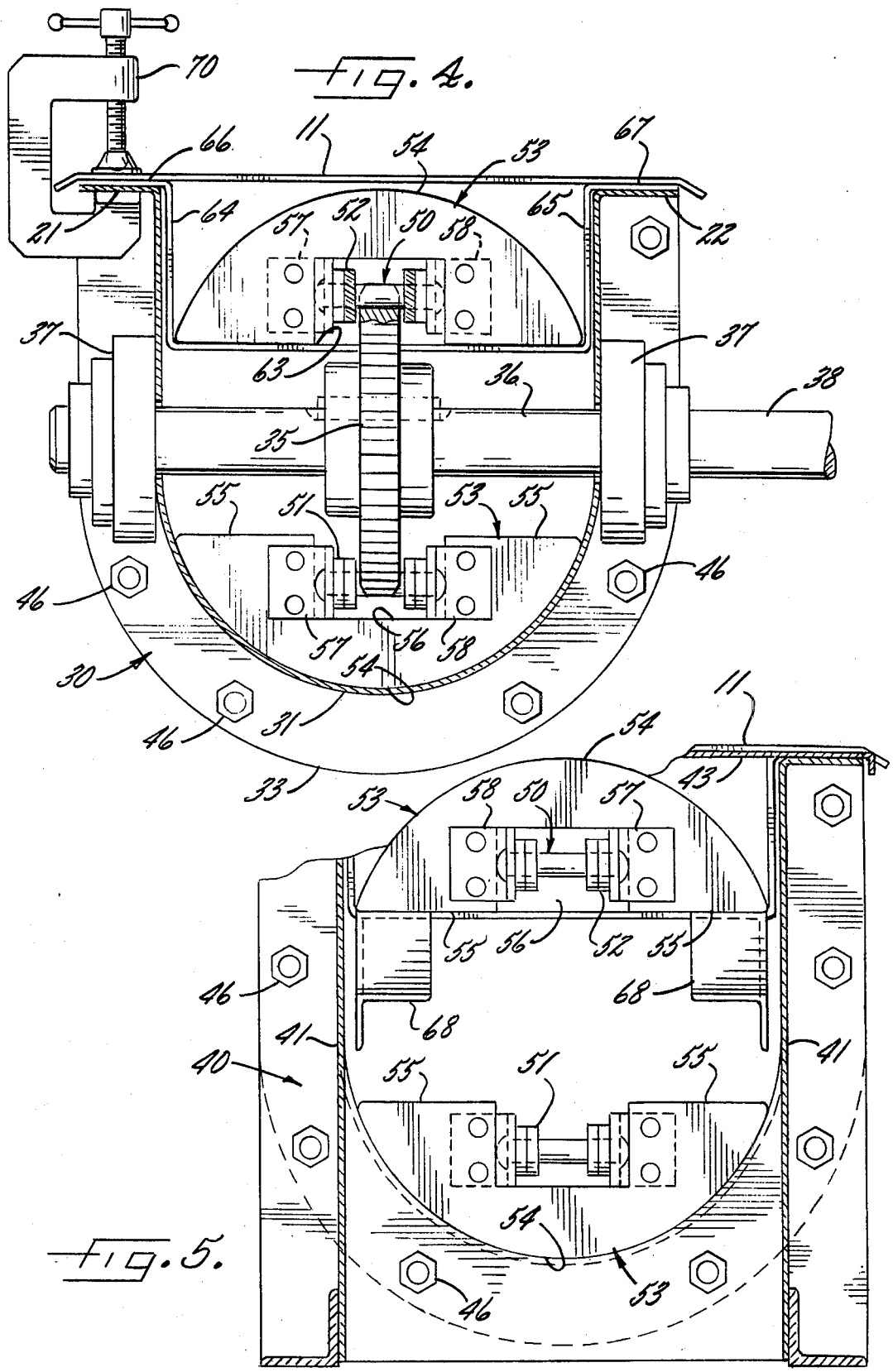
FIG. 4 is a transverse section looking along line 4—4 in FIG. 1.
FIG. 5 is a transverse section looking along the line 5—5 in FIG. 1.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Turning first to FIG. 2 of the drawings, the elements forming a typical conveyor of the screw or auger type include a main trough 10, a relatively flat cover 11, an auger 12, and end plates 13, 14 having bearings for journaling the auger shaft. Framework (not shown) is provided for supporting the main trough 10 in an inclined position, and, as the auger shaft is driven, bulk material is progressively transported by the auger flights from an entry duct, generally indicated at 15, at the lower end to an outlet duct 16 at the upper end.

Turning more detailed attention to the main trough 10 it will be seen that it has a semi-circular bottom conforming to the curvature of the auger flights, that it has parallel flanges 21, 22 extending horizontally outwardly along its upper edges as well as end flanges 23, 24 extending outwardly along its end edges. Bolt holes 25 are provided in matched positions for normally securing plate 13 to flange 23 and plate 14 to flange 24.

In accordance with the present invention a kit is provided for converting the main trough and cover of a screw type conveyor to a drag chain conveyor of advanced design, the kit including a pair of sprocket boxes, an endless drag chain trained about the sprockets, conveyor flights secured to the chain at spaced intervals and a relatively shallow auxiliary trough of rectangularly U-shaped cross section which is nested in the main trough and supported by the flanges on the latter.

Thus a sprocket box 30 is provided at the head end preferably in the form of a short section of U-shaped trough 31 enclosed at its outer end by a mounting plate 32 and having an inner end flange 33 which matches the end flange 23 on the main trough. Contained within the sprocket box is a sprocket wheel 35 mounted upon a cross shaft 36 journaled in outboard bearings 37, the outer end 38 of the shaft being accessible as a driving connection to a suitably powered drive 39.

A second sprocket box 40 is provided at the tail end having side walls 41, a rear mounting plate 42 and a cover 43. At its front end the box includes an inwardly directed flange 44 for matched engagement to the flange 24 on the main trough.

Where the bolt holes 25 on the main trough are in a known or standardized pattern, corresponding holes 45 in the sprocket boxes may be pre-drilled, but where the holes 25 are not standardized, then the holes 45 in the boxes may be omitted. In such circumstances it is a simple matter to abut the flanges using the existing holes 25 as a pilot or guide in the drilling of matching holes 45. Regular or self-tapping bolts 46 may be used.

Contained within the sprocket box 40 is a sprocket wheel 47 mounted on a shaft 48 mounted in a pair of shiftable bearings 49 for the purpose of taking up any slack or tensioning the chain.

With the two sprocket boxes 30, 40 bolted in position, a sprocket chain 50 is installed, the chain having a lower run 51 which is laid in the bottom of the trough and an upper or return run 52. Conveyor flights 53, secured to the chain at spaced intervals, extend at right angles thereto. Each flight 53 is of semi-circular shape having a curved outer edge 54 which conforms to the curvature of the bottom of the main trough, and a straight edge 55. Each flight is formed with a central notch 56 along its straight edge for the purpose of accommodating the chain 50 and for providing clearance, as will be discussed. The chain is secured to the individual flights by means of small angle brackets 57, 58.

As part of the kit, and in the carrying out of the present invention, a relatively shallow auxiliary trough of rectangularly U-shaped cross section is provided having a width dimension such as to achieve a nested fit of the auxiliary trough into the main trough and having parallel flanges which extend horizontally outwardly along its respective upper edges for support upon the corresponding flanges of the main trough. The auziliary trough, indicated at 60, has a near end 61 and a tail end 62. The auxiliary trough is preferably formed of a sheet of metal bent to provide a flat bottom surface 63, side walls 64, 65 and parallel outwardly extended flanges 66, 67. A pair of ramps 68 at the tail end guide the flights onto the surface 63 for the return trip.

In completing assembly of the kit to form the finished conveyor, the lower run of the chain is laid in place, the auxiliary trough 60 is lowered into its nested position (FIGS. 4 and 5), and the free ends of the chain, with the flights mounted thereon, are folded into supported position on the surface 63. The ends of the chain are coupled together to complete the upper run of chain and the chain is tensioned by adjusting the shiftable bearings 49 (FIG. 3). The cover 11, which was originally seated upon the flanges of the main trough, is, instead, seated upon the flanges of the auxiliary trough, which are of such width that, when the cover is applied, the flanges on the auxiliary trough, the corresponding flanges on the main trough and the outer edges of the cover form a sandwich construction. Such sandwich is kept in clamped condition by any desired clamping means applied at intervals along the edge as, for example, a series of C-clamps 70 as illustrated in FIG. 4.

In accordance with one of the aspects of the present invention the sprocket boxes are utilized for feeding, and for withdrawing material from, the respective ends of the conveyor assembly. For this purpose the top of the sprocket box 30 is left open and bulk material is fed into it via a duct or connection 71 (FIG. 1). Conversely, the bottom of the sprocket box 40 is left open to provide for discharge through a duct or connection 72. Utilizing the sprocket boxes in this fashion provides a large cross sectional flow area commensurate with the increase in flow capacity inherent in the use of a chain and flights, so that the productivity of the conveyor is increased in a practical case on the order of twenty-five percent or more. The outboard mounting of the bearings 37 and 49 avoids contamination of the conveyed material; the chain normally operates dry.

As an alternative, the entry and exit ducts 15, 16 at the lower and upper ends, respectively, used in the device in its augering funcion, may be preserved and made use of. Where the openings at 15, 16 are not required they may simply be covered by appropriate sheet metal.

In practicing the invention the auxiliary trough 60 is preferably provided, as part of the conversion kit, in relatively short sections arranged end to end and interfitted to keep the presented end edges of adjacent sections in alinement with one another for smooth return passage of the flights. This is accomplished as illustrated in FIG. 6 in which two adjacent sections of trough are shown in separated relation at 61a, 62a. The presented end of the section 62a has a socket 80 consisting of two opposed members welded to the upper and lower surfaces, respectively, as indicated at 81, 82, the upper member 81 being centered in a position registered with respect to the clearance space within the notch 63 (FIG. 7) formed in each of the flights thereby to insure that the flights have smooth uninterrupted guidance from one section of the auxiliary trough to the next. Alinement is automatic and no reliance is placed upon the skill of the assembler.

This permits the auxiliary trough, regardless of length, to be supplied as part of the kit in relatively short easily handled sections, with a socket 80 being provided wherever a "break" in the length is desired. For example, the sections may be limited to a length of say eight, ten or twelve feet thereby to employ a relatively compact shipping package to reduce shipping expense.

The kit, upon unpacking, is simple and self-explanatory, even to a relatively unskilled workman having little or no experience in machinery set-ups. First of all, the disassembly of the original auger conveyor is simply accomplished by loosening of clamps and unscrewing of the bolts holding the end plates. Where the auger conveyor has made use of standardized bolt positions, the holes which are already in place in the sprocket boxes enable easy and obvious bolting together. Where the box and flanges are supplied in the undrilled state, the parts are temporarily clamped together for drilling through the original flange openings using the original holes as pilot holes.

Once the sprocket boxes have been secured in place the lower run of chain is installed, the auxiliary trough is inserted, the upper run of chain is completed and tightened and the cover is applied. Feed connections 71, 72 (or alternatively, 15, 16) are established and a drive connection is made to complete the installation. In practice, only a few hours are required for the entire job and the resulting chain drag assembly is fully state-of-the-art, fulfilling all of the objects which have already been set forth above.

It is to be noted that the main trough 10 is preserved intact regardless of the conveyor length and without any need to perform surgery, for example, by providing additional idler sprockets along the length of the trough, a common expedient in conveyors of the chain drag type. Consequently, since the conveyor trough is uninterrupted from one end to the other by extraneous structure, disassembly for purposes of maintenance or inspection is an easy matter, the assembly procedure being simply reversed:

First of all the clamps are removed and the connected ends of the chain, now exposed, are disconnected and laid back to an out-of-the-way position, following which the auxiliary trough may be removed to expose the lower run of chain which takes but a few minutes time. Replacement of a broken flight is quick and easy and can usually be accomplished without having to remove the chain from the conveyor.

While the invention has been described in connection with the use of an auxiliary trough bent from a single sheet of metal into trough shape, and with continuous side walls 64, 65 and continuous supportive flanges 66, 67, it will be understood that the side walls and the horizontal flanges which are secured thereto may be longitudinally discontinuous for the purpose of saving metal but without departing from the invention. Also while the auxiliary trough has been described as having a "flat" bottom 63 for guidance purposes, it will be understood that the term applies to the plane of guidance and that this does not preclude the use of longitudinal rails on, or forming a part of, the surface 63. Finally, while the invention has been described in connection with the conversion of a screw conveyor having a single section of main trough, it will be understood that the invention is not limited thereto and is equally applicable to conversion of conveyors in which the main trough, either level or inclined, is made up of a number of sections secured end to end, as will generally be the case.

What is claimed is:

1. A drag chain conveyor kit for converting a screw conveyor to a drag chain conveyor, the screw conveyor being of the type having a main trough having a semi-circular bottom with parallel flanges extending horizontally outwardly along its upper edges and end flanges extending outwardly along its end edges together with a removable matching substantially flat cover having side edges dimensioned to rest on the parallel flanges, the combination comprising a pair of sprocket boxes dimensioned for assembly on the respective end flanges of the main trough and having mutually aligned sprockets journaled therein including a drive sprocket, an endless drag chain trained about the sprockets to form lower and upper runs of chain, conveyor flights secured to the chain at spaced intervals and extending at right angles thereto, the flights each having a semi-circular edge conforming to the semi-circular bottom of the main trough and having a straight edge, a relatively shallow auxiliary trough of rectangularly U-shaped cross section having parallel flanges extending horizontally outwardly along its respective upper edges and having a width dimension such as to provide a nested fit of the auxiliary trough into the main trough with the horizontal flanges on the auxiliary trough supported on the corresponding flanges of the main trough, the auxiliary trough having a flat bottom forming a return guide surface for the straight edges of the flights on the upper run of chain, the flanges on the auxiliary trough being of such width that when the cover is applied (1) the horizontal flanges on the auxiliary trough, (2) the corresponding flanges on the main trough, and (3) the outer edges of the cover form a sandwich construction, and a series of clamps at intervals along the flanges for clamping such flanges and cover together, the auxiliary trough being provided in relatively short sections arranged end to end, interfitted means to keep the presented end edges of the adjacent sections in alignment with one another, the straight edges of the flights being centrally notched to accommodate the chain and to provide clearance space, the interfitted means including opposedly positioned upper and lower members at the end of a section defining a socket for the adjacent section, the upper member being centered in a position registered with the clearance spaces in the successive flights to insure that the flights have smooth uninterrupted guidance from one section of the auxiliary trough to the next during their return passage.

* * * * *